United States Patent
Min et al.

(10) Patent No.: US 10,454,666 B2
(45) Date of Patent: Oct. 22, 2019

(54) METHOD AND DEVICE FOR SYNCHRONIZING INPUT/OUTPUT SIGNALS BY RADIO FREQUENCY UNIT IN WIRELESS COMMUNICATION SYSTEM

(71) Applicant: Samsung Electronics Co., Ltd., Suwon-si, Gyeonggi-do (KR)

(72) Inventors: Taeyoung Min, Suwon-si (KR); Youngyoon Woo, Hwaseong-si (KR); Jaehyung Im, Yongin-si (KR); Pavel Martynovich, Suwon-si (KR)

(73) Assignee: Samsunng Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/546,495

(22) PCT Filed: Feb. 2, 2016

(86) PCT No.: PCT/KR2016/001149
§ 371 (c)(1),
(2) Date: Jul. 26, 2017

(87) PCT Pub. No.: WO2016/126089
PCT Pub. Date: Aug. 11, 2016

(65) Prior Publication Data
US 2018/0013542 A1  Jan. 11, 2018

(30) Foreign Application Priority Data
Feb. 2, 2015 (KR) .................. 10-2015-0015848

(51) Int. Cl.
*H04L 7/02* (2006.01)
*H04B 17/10* (2015.01)
(Continued)

(52) U.S. Cl.
CPC ............ *H04L 7/02* (2013.01); *H04B 17/0085* (2013.01); *H04B 17/101* (2015.01); *H04B 17/13* (2015.01);
(Continued)

(58) Field of Classification Search
CPC ................ H04B 17/0085; H04B 17/24; H04L 25/03343; H04L 27/368; H04L 1/244
See application file for complete search history.

(56) References Cited

U.S. PATENT DOCUMENTS

| 3,395,340 A | * | 7/1968 | Anstey | ................... | G01R 27/32 324/615 |
| 6,532,256 B2 | | 3/2003 | Miller | | |

(Continued)

FOREIGN PATENT DOCUMENTS

EP  2 472 727 B1  7/2013

*Primary Examiner* — Ross Varndell
(74) *Attorney, Agent, or Firm* — Jefferson IP Law, LLP

(57) ABSTRACT

The present invention relates to an input/output signal synchronization method by a radio frequency unit. The input/output signal synchronization method according to the present invention comprises the steps of: generating a transmitter (Tx) input signal by adding, to a baseband signal, a test signal located at a frequency out of an operation frequency range of the radio frequency unit; collecting the Tx input signal and a Tx output signal obtained by outputting the input signal through a Tx function block; and synchronizing the Tx input signal and the Tx output signals, based on a result obtained by the collecting.

7 Claims, 6 Drawing Sheets

(51) Int. Cl.
*H04L 7/00* (2006.01)
*H04L 1/24* (2006.01)
*H04B 17/00* (2015.01)
*H04B 17/13* (2015.01)
*H04B 17/19* (2015.01)

(52) U.S. Cl.
CPC ............ *H04L 1/244* (2013.01); *H04L 7/0029* (2013.01); *H04B 17/10* (2015.01); *H04B 17/104* (2015.01); *H04B 17/19* (2015.01); *H04L 7/0008* (2013.01); *H04L 7/0016* (2013.01)

(56) References Cited

U.S. PATENT DOCUMENTS

| | | |
|---|---|---|
| 7,016,431 B2 | 3/2006 | Schrader et al. |
| 8,619,903 B2 | 12/2013 | Schmidt et al. |
| 8,855,234 B2 | 10/2014 | Kim et al. |
| 2002/0009132 A1* | 1/2002 | Miller ............... H04K 1/02 375/222 |
| 2012/0087443 A1 | 4/2012 | Olsson et al. |
| 2013/0077713 A1 | 3/2013 | Kim et al. |
| 2013/0287145 A1 | 10/2013 | Park |
| 2014/0242976 A1* | 8/2014 | Suenaga ............ H04W 24/06 455/423 |
| 2015/0241523 A1* | 8/2015 | Scherr ............. G01R 33/0023 324/244 |

\* cited by examiner

METHOD AND DEVICE FOR SYNCHRONIZING INPUT/OUTPUT SIGNALS BY RADIO FREQUENCY UNIT IN WIRELESS COMMUNICATION SYSTEM

TECHNICAL FIELD

The present invention relates to a wireless communication system, and more particularly, to a method and a device for synchronizing input signals and output signals by a radio frequency unit.

BACKGROUND ART

A radio frequency unit (RU) receives a baseband signal received by the radio frequency unit and up-converts the received baseband signal into a radio frequency signal, amplifies the up-converted radio frequency signal by a power amplifier, and then transmits the amplified signal through an antenna. In addition, a bandpass filter and a feedback unit may be connected to an output terminal of the radio frequency unit to remove a signal included in a frequency out of an operation frequency and to monitor an output signal.

The radio frequency unit monitors the output signal through the feedback unit, thereby performing operations of synchronizing the input/output signals, identifying and compensating for nonlinearity of the signal amplified by the power amplifier, and reducing magnitude of a peak of the signal. The radio frequency unit may transmit an undistorted output signal to other entities by the operation of the synchronization, the operation of compensating for the nonlinearity of the amplified signal, and the operation of reducing the magnitude of the peak of the signal.

However, the radio frequency unit receives and processes a baseband signal. The radio frequency unit may not know in advance whether the baseband signal is input at specific timing and magnitude and characteristics of the baseband signal when the baseband signal is input. Therefore, there arises a problem in that the operation of the synchronization and the operation of compensating for the nonlinearity of the amplified signal are not performed smoothly.

DISCLOSURE OF INVENTION

Technical Problem

The present invention has been made in order to solve the above problems, and an object of the present invention is to provide a method and a device for synchronizing input/output signals based on a test signal located at a frequency out of an operation frequency of a radio frequency unit.

Solution to Problem

In order to achieve the objects, according to an embodiment of the present invention, a method for synchronizing input/output signals may include: generating a transmitter (Tx) input signal by adding, to a baseband signal, a test signal located at a frequency out of an operation frequency range of the radio frequency unit; collecting the Tx input signal and a Tx output signal obtained by outputting the input signal through a Tx function block; and synchronizing the Tx input signal and the Tx output signal, based on a result obtained by the collecting.

In order to achieve the objects, according to an embodiment of the present invention, a method for performing a digital pre-distortion (DPD) operation may include: generating a transmitter (Tx) input signal by adding, to a baseband signal, a test signal located at a frequency out of an operation frequency range of the radio frequency unit; collecting the Tx input signal and a Tx output signal obtained by outputting the input signal through a Tx function block; and compensating for nonlinearity of the Tx output signal, based on a result obtained by the collecting.

In order to achieve the objects, according to an embodiment of the present invention, a method for performing a cresto factor reduction (CFR) operation may include: measuring a magnitude and a phase of a peak of a baseband signal; determining whether the magnitude of the peak of the baseband signal exceeds a preset value; generating a test signal located at a frequency out of an operation frequency range of the radio frequency unit based on the magnitude and the phase of the peak of the baseband signal if the magnitude of the peak of the baseband signal exceeds the preset value; and adding the generated test signal to the baseband signal.

In order to achieve the objects, according to an embodiment of the present invention, a radio frequency unit may include: a controller configured to perform a control to generate a transmitter (Tx) input signal by adding, to a baseband signal, a test signal located at a frequency out of an operation frequency range of the radio frequency unit, collect the Tx input signal and a Tx output signal obtained by outputting the input signal through a Tx function block; and synchronize the Tx input signal and the Tx output signal, based on a result obtained by the collecting; and a storage unit configured to store the test signal.

In order to achieve the objects, according to an embodiment of the present invention, a radio frequency unit may include: a controller configured to perform a control to generate a transmitter (Tx) input signal by adding, to a baseband signal, a test signal located at a frequency out of an operation frequency range of the radio frequency unit, collect the Tx input signal and a Tx output signal obtained by outputting the input signal through a Tx function block; and compensate for nonlinearity of the Tx output signal, based on a result obtained by the collecting; and a storage unit configured to store the test signal.

In order to achieve the objects, according to an embodiment of the present invention, a radio frequency unit may include: a controller configured to perform a control to measure a magnitude and a phase of the peak of a baseband signal, determine whether the magnitude of the peak of the baseband signal exceeds a preset value, and add a test signal to the baseband signal if it is determined that the magnitude of the peak of the baseband signal exceeds the preset value; and a test signal generator configured to generate a test signal located at a frequency out of an operation frequency range of the radio frequency unit based on the magnitude and the phase of the peak of the baseband signal.

Advantageous Effects of Invention

In accordance with the embodiments of the present invention, it is possible to smoothly perform the synchronization of the input/output signals of the radio frequency unit without being influenced by the characteristics of the baseband signal by adding the test signal located at the frequency out of the operation frequency of the radio frequency unit to the baseband signal input to the radio frequency unit.

MODE FOR THE INVENTION

Figure 1:
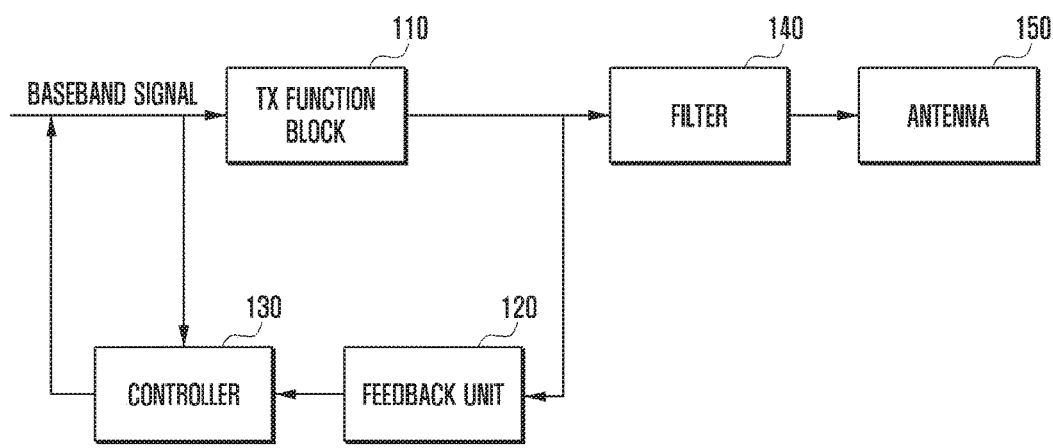
FIG. 1 is a diagram showing an internal structure of a radio frequency unit (RU).

Hereinafter, embodiments of the present invention will be described in detail with reference to the accompanying drawings.

In describing the embodiments of the present invention, a description of technical contents which are well known to the art to which the present invention belongs and are not directly connected with the present invention will be omitted. This is to more clearly transfer a gist of the present invention by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

In describing the embodiments of the present invention, a description of technical contents which are well known to the art to which the present invention belongs and are not directly connected with the present invention will be omitted. This is to more clearly transfer a gist of the present invention by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present invention and methods accomplishing the same will become apparent from the following detailed description of embodiments with reference to the accompanying drawings. However, the present invention is not limited to the embodiments disclosed herein but will be implemented in various forms. The embodiments have made disclosure of the present invention complete and are provided so that those skilled in the art can easily understand the scope of the present invention. Therefore, the present invention will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '~unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may further separated into additional components and '~units'. In addition, the components and the '~units' may also be implemented to reproduce one or more CPUs within a device or a security multimedia card.

FIG. 1 is a diagram showing an internal structure of a radio frequency unit (RU).

As shown in FIG. 1, a radio frequency unit 100 includes a transmitter functional block 110 (hereinafter, Tx function block), a feedback unit 120, a controller 130, a filter 140, and an antenna unit 150.

A radio frequency unit may receive a signal from a higher level, and a signal received by the radio frequency unit is called a baseband signal. If the baseband signal is received in the radio frequency unit, the baseband signal is input to the Tx function block 110.

The Tx function block 110 may include a digital to analog converter (DAC), a mixer, a filter, a power amplifier, and the like.

Accordingly, the baseband signal input to Tx function block 110 may be converted into an analog signal via a D/A converter. Also, the baseband signal may be frequency-converted by the mixer, and the signal converted by the D/A converter and the mixer may be amplified by the power amplifier. However, the signal amplified by the power amplifier may be distorted as compared with an input signal, and a method of compensating for the distortion is referred to as digital pre-distortion (DPD). The detailed content thereof will be described below.

The filter 140 is connected to an output terminal of the Tx function block 110 to serve to remove a signal located at a frequency out of an operation frequency range. The filter 110 may be configured as the bandpass filter. Therefore, the signal located at frequency out of a radio frequency range is removed by the filter, and therefore does not affect an output signal.

The antenna unit 150 is connected to the filter 140 to serve to transmit a signal received from the filter 140.

The feedback unit 120 is connected to the output terminal of the Tx function block 110 to feed back the output signal output through the Tx function block 110, and the feedback unit 120 includes a mixer, an analog converter to digital (ADC), a filter, and the like.

The feedback unit 120 may transmit the output signal output through the Tx function block 110 to the controller 130.

The controller 130 may receive the output signal output through the Tx function block and the baseband signal received by the radio frequency unit. In addition, the controller 130 may compare the received output signal with the received baseband signal to perform functions such as loop delay compensation, digital pre-distortion (DPD), and crest factor reduction (CFR).

In detail, the controller 130 may perform the delay compensation by measuring and compensating for the delay of the output signal with respect to the baseband signal in order to synchronize the output/input signals. The reason why the controller 130 performs the delay compensation is that the output signal needs to pass through the feedback unit 120 to be received by the controller and therefore has a transmission path different from the baseband signal and thus the baseband signal and the output signal are not synchronized with each other. Accordingly, the controller 130 may perform a delay compensation process, in which the delay compensation process may use a correlation between the received baseband signal and the output signal. That is, the controller 130 obtains a delay value of a part where the correlation between the baseband signal and the output signal becomes largest to compensate for the output signal, thereby synchronizing the output/input signals.

In addition, the controller 130 may perform the digital pre-distortion (DPD) process to compensate for nonlinearity of the output signal output through amplifier. The reason why the controller 130 performs the DPD process is that the baseband signal may be distorted when the baseband signal is amplified by the power amplifier. Accordingly, the controller 130 may compare the received output signal with the baseband signal to identify the nonlinearity of the output signal. In addition, the controller 130 may use an inverse function relationship between the output signal and the baseband signal to compensate for the nonlinearity of the output signal.

Also, the controller 130 may perform the crest factor reduction (CFR) process to lower a peak-to-average power ratio (PAPR) of the output signal. The reason why the controller 130 performs the CFR process is to use a power amplifier with low power consumption. Specifically, the PAPR means a ratio of an average power to a peak power of a signal, and a power amplifier having large power consumption is required to amplify a signal having a high PAPR. Accordingly, if the controller 130 generates a peak signal having a predetermined value or higher, the radio frequency unit may use a power amplifier with low power consumption by performing the CFR process for lowering the PAPR.

However, since the radio frequency unit may not know in advance whether the baseband signal is input at specific timing and magnitude and characteristics of the baseband signal when the baseband signal is input, the delay compensation, DPD, CFR processes or the like may not be smoothly performed.

For example, when a dual carrier is used, the signal has periodicity, such that the delay compensation is not smooth because of the large correlation between the periods. In addition, when a single carrier is used, the linearity of the output signal can not be identified due to a small magnitude change of the signal, and the DPD process is not smooth. Also, when CFR is performed, a part of the signal may be removed to cause the distortion of the signal.

Accordingly, the present invention proposes a method for smoothly performing delay compensation, DPD, and CFR processes using test signal located at frequency out of an operation frequency range of a radio frequency unit.

Figure 2:
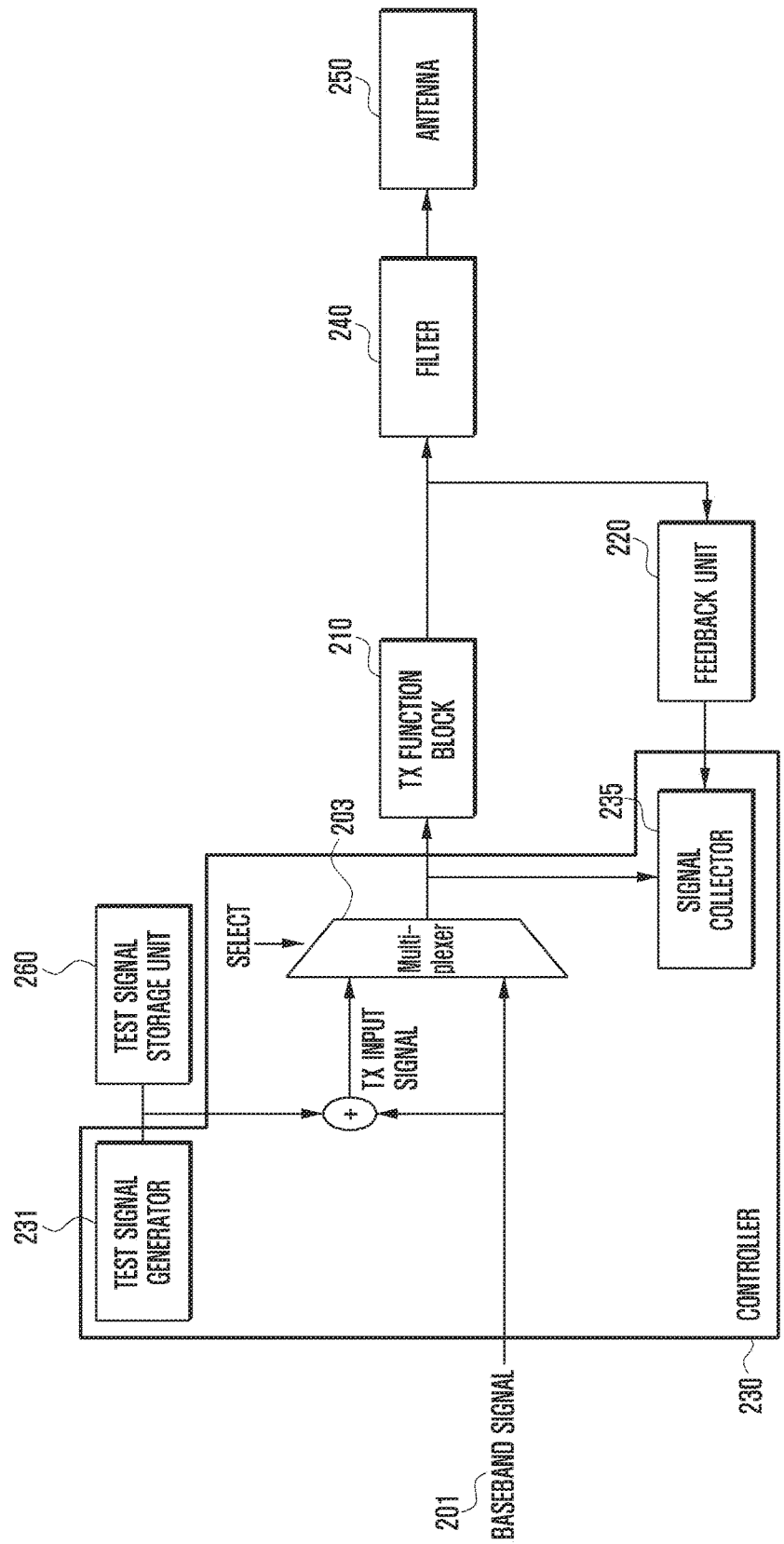
FIG. 2 is a diagram showing an internal structure of the radio frequency unit according to an embodiment of the present invention.

FIG. 2 is a diagram showing an internal structure of the radio frequency unit according to an embodiment of the present invention.

As shown in FIG. 2, a radio frequency unit 200 of the present invention includes a Tx function block 210, a feedback unit 220, a controller 230, a filter 240, an antenna unit 250, and a test signal storage unit 260.

The Tx function block 210, the feedback unit 220, the filter 240, and the antenna unit 250 of the present invention perform the same role as the Tx function block 110, the feedback unit 120, the filter 140, and the antenna unit 150 described in FIG. 1. Therefore, the detailed description thereof will be omitted.

In addition, the signal input to the radio frequency unit is referred to as the baseband signal, a signal obtained by adding the test signal to the baseband signal is referred to as a Tx input signal, and a signal output by passing the Tx input signal through the Tx function block 110 is referred to as a Tx output signal.

In the present invention, the controller 230 may receive a baseband signal and add a test signal to the baseband signal to generate the Tx input signal.

The controller 230 generates the Tx input signal by adding test signal located at a frequency out of the operation frequency range of the radio frequency unit to the baseband signal.

The test signal may be generated from a test signal generator 231 included in the controller 230 and added to the baseband signal. Alternatively, the test signal may be stored in the test signal storage unit 260 in advance.

In addition, the test signal may include a broadband noise signal having no regularity. Alternatively, the test signal may include a signal from which additive white Gaussian noise is filtered. That is, the test signal may include white Gaussian noise from which a frequency out of a specific frequency range is removed.

However, the test signal is not limited to the above-described content, and may be stored in the test signal storage unit 260 in various forms In addition, the controller 230 may include a signal collector 235 to collect the baseband signal and the Tx input signal.

In addition, the controller 230 may include a multiplexer. The multiplexer serves to selectively output the input signal. Therefore, the multiplexer may receive the baseband signal 201 and the Tx input signal 203 and may selectively output the baseband signal 201 and the Tx input signal 203. Therefore, it is possible to selectively apply whether to use the Tx input signal to which the test signal of the present invention is added by using the controller including the multiplexer.

However, the configuration of the controller 230 is merely an example and is not limited to the above form.

Figure 3:
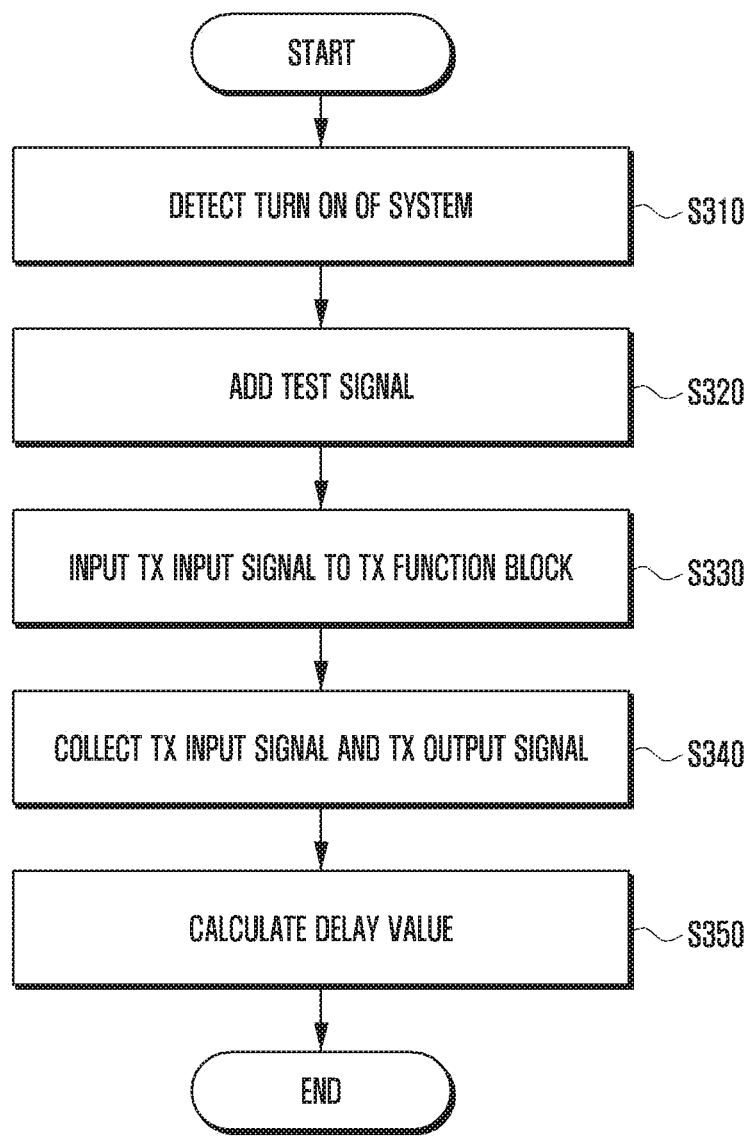
FIG. 3 is a flow chart showing an operation of synchronizing input/output signals according to an embodiment of the present invention.

FIG. 3 is a flow chart showing an operation of synchronizing input/output signals according to an embodiment of the present invention.

In step S310, the controller detects that the system is turned on.

In step S320, the controller adds the test signal to the received baseband signal to generate the Tx input signal.

In step S320, the controller 230 adds the test signal located at the frequency out of the operation frequency range of the radio frequency unit to the baseband signal to generate the Tx input signal. The controller may add the test signal located at the frequency out of the operation frequency range of the radio frequency unit to the baseband signal, thereby synchronizing the input/output signals without being affected by presence or absence, characteristics or the like of the signal input to the radio frequency unit. In addition, since the test signal is located at the frequency out of the operation frequency range, the test signal is removed by the filter included in the radio frequency unit and therefore does not affect the output signal. The detailed content thereof will be described below.

The test signal added by the controller may be a signal stored in the test signal storage unit. In addition, the test signal may be a broadband noise signal having no regularity. Alternatively, the test signal may be the signal from which the additive white Gaussian noise is filtered. That is, the test signal may include the white Gaussian noise from which the frequency out of the specific frequency range is removed.

In addition, the test signal may be a signal whose auto correlation value satisfies a predetermined reference or more. The controller calculates a cross correlation between the Tx input signal received by the controller and the output signal (hereinafter, referred to as the Tx output signal) passed through the Tx function block to synchronize the input/output signals. Therefore, if the test signal satisfies a predetermined reference value or higher without the auto correlation, the synchronization may be smoothly performed regardless of the characteristics of the baseband signal.

However, the test signal of the present invention is not limited to the above contents, and may be configured in various forms.

If the test signal is added to the baseband signal, in step S330, the controller may transmit the Tx input signal input to the multiplexer to the Tx function block.

The controller may include a multiplexer that serves to output one of a plurality of input signals. In the present invention, the controller may receive the baseband signal and the Tx input signal as the input of the multiplexer. In addition, the controller may control the multiplexer to select and output the Tx input signal. Alternatively, the controller may control the multiplexer to output the baseband signal. That is, the controller may selectively apply whether to use the Tx input signal.

If the Tx input signal is input to the Tx function block, in step S340, the controller may collect the Tx input signal and the Tx output signal. The Tx input signal and the Tx output signal may be collected by a signal collector included in the controller.

The Tx output signal may refer to the signal output through the Tx function block. Since the Tx function block may include the DAC, the mixer, the power amplifier, and the like, the Tx output signal may refer to a signal obtained by allowing the DAC, the mixer, the power amplifier, or the like included in the Tx function block to convert and output the Tx input signal.

The controller that has collected the Tx input signal and the Tx output signal may a control the output of the multiplexer to be the baseband signal. If the controller collects both the Tx input signal and the Tx output signal for synchronizing the input/output signals, there is no longer need to add the test signal to the baseband signal.

In step S350, the controller calculates the collected Tx input signal and Tx output signal to calculate the Tx output signal for the Tx input signal and compensates for the calculated delay value for the Tx output signal, thereby synchronizing the Tx input signal and the Tx output signal.

Specifically, the operation of synchronizing the input/output signals is as follows. After receiving the Tx input signal and the Tx output signal, the controller may calculate the cross correlation between the Tx input signal and the Tx output signal. The controller may calculate an index having the largest cross correlation value. The controller obtaining the index having the largest cross correlation value may synchronize the Tx input signal and the Tx output signal by delaying the Tx output signal by the index.

As a method of delaying a Tx output signal, a method of writing a value to a variable delay implemented in a digital circuit may be used.

For example, it is assumed that 4096 input signals x and output signals y are received. At this time, an average difference between $x[1]$ to $x[4096]$ and $y[1]$ to $y[4096]$ is obtained and the index of the input signal is shifted to the right by one and the index of the output signal is shifted to the left by one, thereby obtaining an average difference of between $x[2]$ to $x[4096]$ and $y[1]$ to $y[4095]$. By the following method, if the input/output signals are shifted to the left and right and are thus most similar to each other, the moving index is used as the delay value to compensate for the output signal.

In the present embodiment, the controller may add the test signal to the baseband signal to synchronize the input/output signal without being affected by the characteristics of the baseband signal.

For example, if the baseband signal is not input to the radio frequency unit or the baseband signal having a constant signal magnitude is input to the radio frequency unit, the controller may not accurately calculate the delay value between the input/output signals, such that the input/output signals may not be synchronized with each other. On the other hand, if the controller adds the test signal to the baseband signal, the controller may obtain the delay value of the output signal regardless of the characteristics and types of the signal input to the radio frequency unit and synchronize the input/output signals.

In addition, the added test signal does not affect the output signal transmitted through the antenna. If the controller synchronizes the Tx input signal and the Tx output signal, the controller inputs the synchronized Tx output signal to the filter. The filter serves to remove the signal included in frequency out of the operation frequency range of the radio frequency unit, such that the test signal is removed by the filter. Therefore, the test signal may not affect the output signal transmitted through the antenna.

Figure 4:
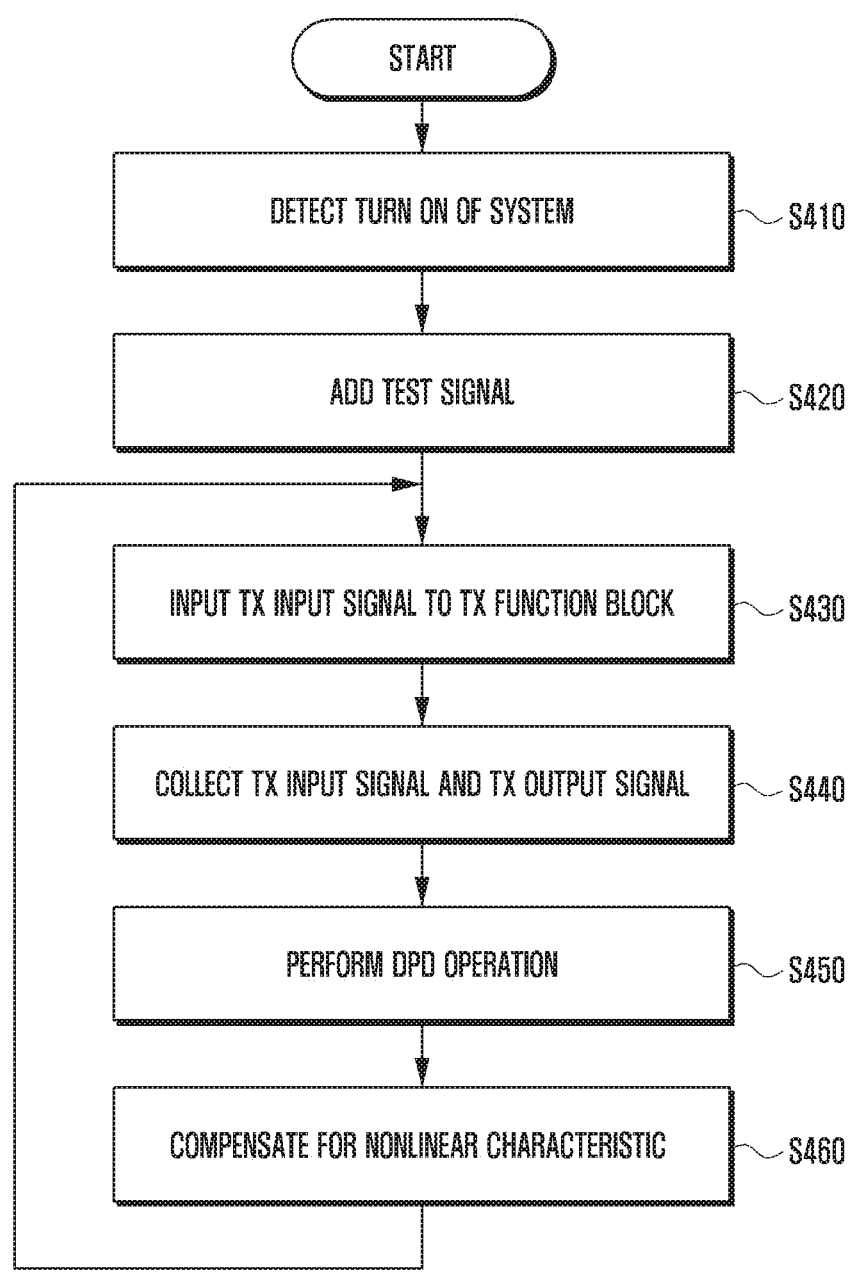
FIG. 4 is a diagram showing an operation of performing a DPD process according to another embodiment of the present invention.

FIG. 4 is a diagram showing an operation of performing a DPD process according to another embodiment of the present invention.

In step S410, the controller detects that the system is turned on.

In step S420, the controller adds the test signal to the received baseband signal, in which the added signal refers to the Tx input signal.

In step S420, the controller adds the test signal located at the frequency out of the operation frequency range of the radio frequency unit to the baseband signal to generate the Tx input signal. The controller may add the test signal located at the frequency out of the operation frequency range of the radio frequency unit to the baseband signal, thereby compensating for the nonlinearity of the input/output signals without being affected by the characteristics of the signal input to the radio frequency unit.

The test signal added by the controller may be the signal stored in the test signal storage unit. In addition, the test signal may be the broadband noise signal having no regularity. Alternatively, the test signal may be the signal from which the additive white Gaussian noise is filtered. That is, the test signal may include the white Gaussian noise from which the frequency out of the specific frequency range is removed.

In addition, the controller may add, to the baseband signal, the test signal that may sufficiently demonstrate the nonlinearity of the power amplifier to compensate for the nonlinearity of the output signal. The signal that may sufficiently demonstrate the nonlinearity of the power amplifier may be, for example, a signal in which the magnitude change in the signal magnitude exceeds a predetermined reference.

However, the test signal of the present invention is not limited to the above contents, and may be configured in various forms.

If the test signal is added to the baseband signal, in step S430, the controller may transmit the Tx input signal input to the multiplexer to the Tx function block.

The controller may include a multiplexer that serves to output one of a plurality of input signals. In the present invention, the controller may receive the baseband signal and the Tx input signal as the input of the multiplexer. In addition, the controller may control the multiplexer to select and output the Tx input signal. Alternatively, the controller may control the multiplexer to output the baseband signal. That is, the controller may selectively apply whether to use the Tx input signal.

If the Tx input signal is input to the Tx function block, in step S440, the controller may collect the Tx input signal and the Tx output signal. The Tx input signal and the Tx output signal may be collected by the signal collector included in the controller.

In step S450, the controller receiving the Tx input signal and the Tx output signal performs the DPD operation using the collected Tx input signal and Tx output signal.

Specifically, the controller may perform an operation of compensating for the nonlinearity occurring in the Tx output signal. In order to compensate for the nonlinearity occurring in the Tx output signal, the controller may use an inverse function between the Tx output signal and the Tx input signal.

For example, assuming a system in which the Tx input signal is x and the Tx output signal is y, the system is modeled as a function f that is represented by y=f(x). Therefore, the controller may compensate for the distortion of the signal by using an inverse function g represented by x=g(y) between the Tx input signal and the Tx output signal.

In step S470, the controller may compensate for the nonlinear characteristics occurring in the Tx output signal using the result of the DPD operation.

The controller compensating for the nonlinearity of the output signal may again return to step S430 to repeat the above process. That is, the controller may continuously or periodically perform the DPD operation. This is because the nonlinear characteristics appearing while passing through the power amplifier may vary depending on the characteristics of the baseband signal received in the radio frequency unit.

In the present embodiment, the controller may add the test signal to the baseband signal to compensate for the nonlinearity of the Tx output signal without being affected by the characteristics of the baseband signal.

For example, if the change in the magnitude of the baseband signal is small in the radio frequency unit, the controller may not accurately figure out the nonlinear characteristics of the signal generated by the power amplifier. Therefore, the controller may not compensate for the nonlinearity of the Tx output signal. However, if the controller adds the test signal whose change exceeds a certain reference level to the baseband signal, the controller may accurately figure out the nonlinear characteristics of the output signal generated by the power amplifier without being affected by the characteristics of the baseband signal.

Further, as described above, since the added test signal is removed by the filter, it does not affect even the output signal output through the antenna.

Figure 5:
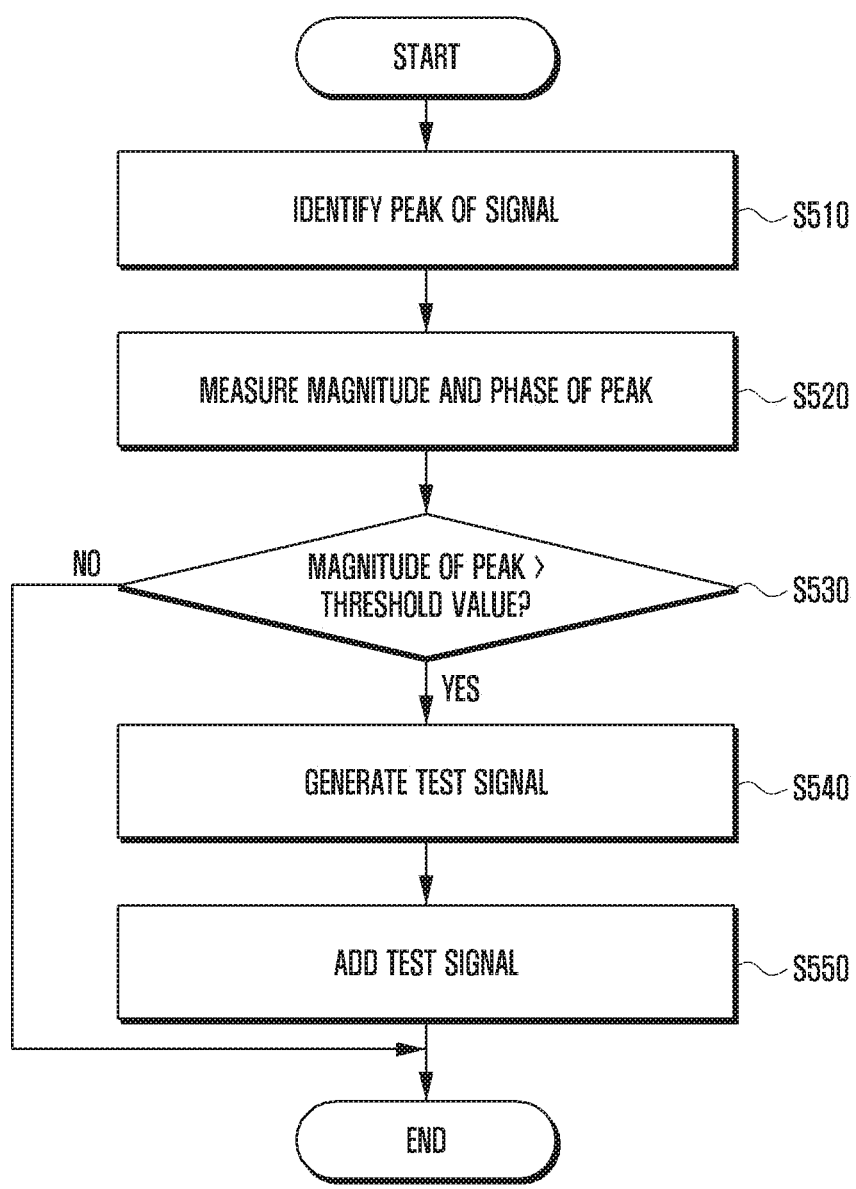
FIG. 5 is a diagram showing an operation of performing a CFR process according to another embodiment of the present invention.

FIG. 5 is a diagram showing an operation of performing a CFR process according to another embodiment of the present invention.

In step S510, the controller identifies the peak of the baseband signal input to the radio frequency unit.

In step S520, the controller measures the magnitude and the phase of the identified peak of the baseband signal.

In step S530, the controller measuring the magnitude and the phase of the peak determines whether the magnitude of the measured peak exceeds a preset threshold value. The threshold value may be preset and stored in the controller.

The controller may decrease the magnitude of the peak if the measured magnitude of peak is large. This is because the larger the measured magnitude of the peak, the larger the PAPR value of the signal, and the power amplifier having large power consumption is required to amplify the signal having the large PAPR value. Accordingly, in order to improve the performance of the radio frequency unit, the controller may determine whether the measured magnitude of the peak exceeds a preset threshold value to determine whether to apply the CFR process of reducing the magnitude of the peak.

If it is determined that the measured magnitude of the peak exceeds the preset threshold value, in step S540, the controller may generate the test signal to reduce the magnitude of the peak. The test signal may be generated by a signal generator included in the controller.

The controller may generate the test signal including a form of a peak cancellation pulse to reduce the magnitude of the peak of the baseband signal. Further, the controller may generate a test signal that has a magnitude obtained by subtracting the threshold value from the magnitude of the peak of the baseband signal and has a phase opposite to the phase of the peak of the signal.

For example, assume that the peak of the currently input baseband signal is m, and the phase thereof is a. Assuming that the magnitude of the preset and stored threshold value is m', the controller determines whether or not the magnitude m of the peak exceeds the threshold value m'.

If it is determined that the magnitude m of the peak exceeds the preset threshold value m', the controller may generate the test signal for reducing the magnitude of the peak. The controller may generate a test signal having a size of m−m' and a phase −a to reduce the magnitude of the peak of the baseband signal to m'.

In addition, the controller may generate the test signal so that the test signal is located at a frequency out of the operation frequency range of the radio frequency unit.

If the peak cancellation pulse is input on the same frequency as the baseband signal, the baseband signal may be distorted. Therefore, the controller may generate the test signal so that the test signal is located at a frequency out of the operation frequency range in order to prevent the input signal from being distorted.

After generating the test signal, in step S540, the controller may add the generated test signal to the baseband signal to generate the Tx input signal.

In addition, in the present embodiment, the controller may periodically or continuously perform the CFR process. Further, the controller may measure the magnitude and the phase of the peak to reduce PAPRs of other baseband signals while generating the test signal to reduce the PAPR of the baseband signal. That is, the CFR process may be performed on other baseband signals before the CFR process of FIG. 5 is terminated.

In addition, in the present embodiment, it is possible to perform the DPD operation, the synchronization operation or the like using the Tx input signal that has undergone the CFR process.

As described above, if the controller performs the CFR process using the test signal located at the frequency out of the operation frequency range, the power amplifier having small power consumption may be used, such that the efficiency of the radio frequency unit may be increased.

Figure 6:
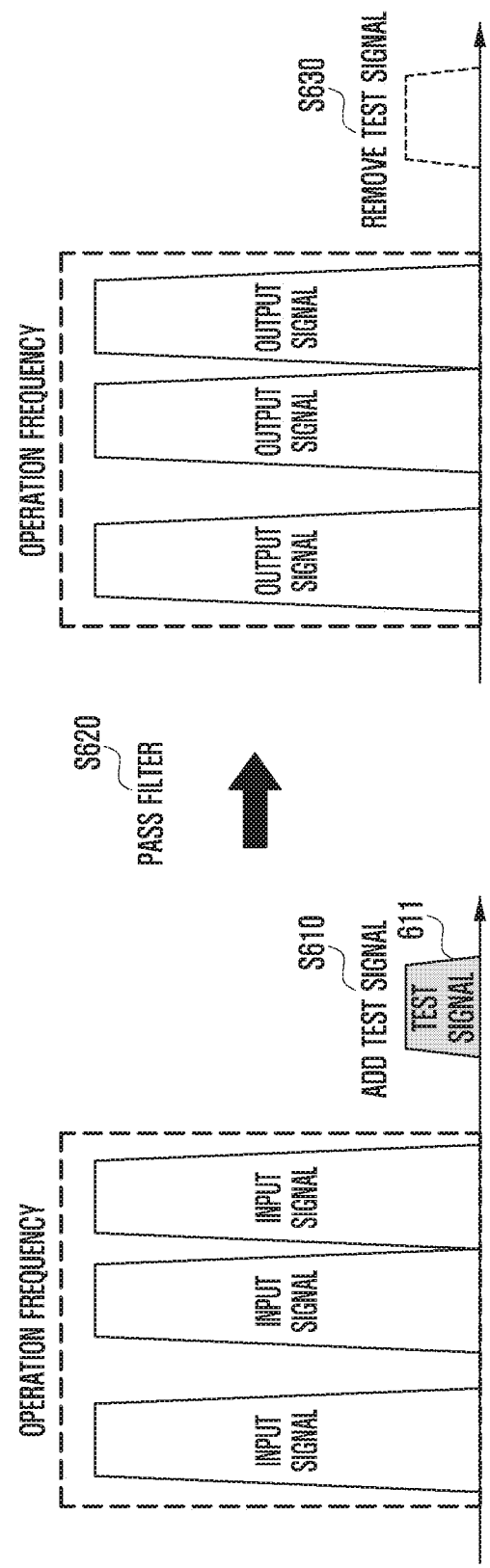
FIG. 6 is a diagram showing an effect obtained by adding a signal located at a frequency out of an operation frequency range according to an embodiment of the present invention.

FIG. 6 is a diagram showing an effect obtained by adding a signal located at a frequency out of an operation frequency range according to an embodiment of the present invention.

As described above, the controller of the present invention adds the test signal located at the frequency other than the operation frequency range to the baseband signal, thereby improving the function of the radio frequency unit and to the baseband signal and not affecting the output signal transmitted through the antenna.

Referring to FIG. 6, in step S610, the controller may add the test signal located at the frequency out of the operation frequency range to the input signal located within the operation frequency range.

The controller may add the test signal pre-stored in the test signal storage unit to the input signal. Alternatively, the controller may add the test signal generated from the test signal generator to the input signal.

If the test signal is added to the input signal, the controller may use the Tx input signal to which the test signal is added to perform the delay compensation, CFR, DPD processes and the like using the Tx input signal to which the test signal is added.

In step S620, the controller that has performed the delay compensation, CFR, DPD, and the like may control the output signal suffering from the delay compensation, CFR, and DPD processes or the like to be transmitted to the filter. The filter may include the bandpass filter that passes only the signal included in the operation frequency range of the radio frequency unit.

Accordingly, in step S630, the filter removes a test signal 611 located out of the operation frequency range among the signals input to the filter. Therefore, only the signal included in the operation frequency is output as the output signal, and the test signal 611 is removed by the filter.

As described above, the added test signal does not affect the output signal, such that the distortion of the signal does not occur and the function of the radio frequency unit may be improved.

Meanwhile, although the exemplary embodiments of the present invention have been illustrated in the present specification and the accompanying drawings and specific terms have been used, they are used in a general meaning in order to assist in the understanding the present invention and do not limit the scope of the present invention. It is obvious to those skilled in the art to which the present invention pertains that various modifications may be made without departing from the scope of the present invention, in addition to the exemplary embodiments disclosed herein.

The invention claimed is:

1. A method for synchronizing signals of a radio frequency unit, comprising:
    generating a transmitter (Tx) input signal by adding, to a baseband signal, a test signal corresponding to a frequency out of an operating frequency range of the radio frequency unit, an autocorrelation value of the test signal being higher than a predetermined value;
    collecting the Tx input signal and a Tx output signal obtained by processing the Tx input signal through a Tx function block;
    synchronizing the Tx input signal and the Tx output signal, based on a cross correlation value between the collected Tx input signal and the Tx output signal; and
    removing the test signal outside of the operating frequency range by a filter.

2. The method of claim 1, wherein the test signal is a pre-stored signal.

3. The method of claim 1, wherein the Tx function block includes at least one of a mixer, a digital to analog converter (DAC), and a power amplifier.

4. The method of claim 1, wherein the test signal includes white Gaussian noise in a specific frequency range.

5. A radio frequency unit, comprising:
    a controller configured to:
        generate a transmitter (Tx) input signal by adding, to a baseband signal, a test signal corresponding to a frequency out of an operating frequency range of the radio frequency unit, an autocorrelation value of the test signal being higher than a predetermined value,
        collect the Tx input signal and a Tx output signal obtained by processing the Tx input signal through a Tx function block,
        synchronize the Tx input signal and the Tx output signal based on a cross correlation value between the collected Tx input signal and the Tx output signal, and
        remove the test signal outside of the operating frequency range by a filter; and
    a memory configured to store the test signal.

6. The radio frequency unit of claim 5, wherein the Tx function block includes at least one of a mixer, a digital to analog converter (DAC), and a power amplifier.

7. The radio frequency unit of claim 5, wherein the test signal includes white Gaussian noise in a specific frequency range.

* * * * *